(12) United States Patent
Bender et al.

(10) Patent No.: US 8,985,846 B2
(45) Date of Patent: Mar. 24, 2015

(54) MULTIFUNCTION LASER POWER METER

(75) Inventors: Eliyahu Bender, Jerusalem (IL);
Shimon Elstein, Merkaz Shapira (IL);
Mark Ivker, Jerusalem (IL)

(73) Assignee: Ophir Optronics Solutions Ltd., Jerusalem (IL)

( * ) Notice: Subject to any disclaimer, the term of this patent is extended or adjusted under 35 U.S.C. 154(b) by 0 days.

(21) Appl. No.: 13/377,578

(22) PCT Filed: Jun. 10, 2010

(86) PCT No.: PCT/IL2010/000460
§ 371 (c)(1),
(2), (4) Date: Jan. 18, 2012

(87) PCT Pub. No.: WO2010/143190
PCT Pub. Date: Dec. 16, 2010

(65) Prior Publication Data
US 2012/0134386 A1    May 31, 2012

Related U.S. Application Data

(60) Provisional application No. 61/213,478, filed on Jun. 12, 2009, provisional application No. 61/272,329, filed on Sep. 14, 2009.

(51) Int. Cl.
*G01K 17/20* (2006.01)
*G01K 17/00* (2006.01)
*G01K 7/28* (2006.01)

(52) U.S. Cl.
CPC ............. *G01K 17/003* (2013.01); *G01K 7/28* (2013.01)
USPC .................. 374/32; 374/E17.002; 250/208.2

(58) Field of Classification Search
CPC combination set(s) only.
See application file for complete search history.

(56) References Cited

U.S. PATENT DOCUMENTS

| 4,451,690 | A | * | 5/1984 | Ishida | 136/201 |
| 4,964,735 | A | | 10/1990 | Sasnett et al. | |
| 5,316,380 | A | * | 5/1994 | Secemski | 374/32 |
| 5,695,283 | A | | 12/1997 | Johnson | |
| 6,025,587 | A | | 2/2000 | Stucchi et al. | |
| 2003/0099276 | A1 | | 5/2003 | Argenti | |
| 2005/0226288 | A1 | * | 10/2005 | Ryan et al. | 372/29.02 |
| 2006/0289721 | A1 | * | 12/2006 | Argenti | 250/208.2 |

OTHER PUBLICATIONS

PCT International Search Report and Written Opinion of the ISA, mailed Sep. 30, 2010 in PCT/IL2010/000460.

* cited by examiner

*Primary Examiner* — Lisa Caputo
*Assistant Examiner* — Nasir U Ahmed
(74) *Attorney, Agent, or Firm* — Fourth Dimension IP; Daniel Feigelson

(57) ABSTRACT

A laser power meter incorporating an absorber disc with a peripheral thermopile ring, either continuous or segmented, and an additional temperature detection element in the central portion, that enables measurement of beam size. This detection element can be a thermopile element, generally a ring of smaller diameter than the peripheral thermopile used, and located closer to the center of the absorber disc. With this arrangement the beam size can be measured, in addition to measurements of the power and the position of the beam. Alternatively, this centralized detection element can be a single thermocouple junction located at the center of the disc, which acts as the hot junction of a thermocouple pair. The second or cold junction is effectively located on the disc close to the peripheral thermopile. Alternatively, two temperature measuring elements can be used, one at the disc center and one at the periphery.

11 Claims, 6 Drawing Sheets

MULTIFUNCTION LASER POWER METER

This is a 35 U.S.C. §371 application of PCT/IL2010/000460, filed Jun. 10, 2010, and claims the benefit under 35 U.S.C. §120 of said PCT application, and further claims the benefit under 35 U.S.C. §119(e) of U.S. Provisional Patent Applications U.S. Ser. No. 61/213,478 and U.S. Ser. No. 61/272,329, filed Jun. 12, 2009 and Sep. 14, 2009 respectively, and entitled "Apparatus for Measuring the Power, Position, And Size of a Laser Beam" and "Laser Power Meter for Measuring the Power, Position, And Size of a Laser Beam", respectively. The contents of these applications are incorporated herein by reference.

FIELD OF THE INVENTION

The present invention relates to the field of laser power measurements, and especially to power measurements which can also determine the size and position of the beam being measured.

BACKGROUND OF THE INVENTION

Optical power meters based on thermopile discs are well known in the art. Such discs are made of a heat conducting material, are heat-sinked at their periphery, and have a central absorber surface area on which the power to be measured impinges. A generally circular thermopile element is disposed near the outer edge of the disc surface, inward of the heat-sinked periphery, such that heat generated by the impinging beam flows outwards towards the cooled periphery, crosses the hot and cold junctions of the thermopile, and generates an integrated voltage across the ends of the thermopile proportional to the power falling on the absorber surface. An entrance aperture in the power meter head using such a disc limits the region of impingement of the beam to be the central absorber surface area.

In U.S. Pat. No. 4,964,735 to M. W. Sasnett et al., there is described a thermocouple laser power meter with the thermopile ring divided into four equal sectors giving a type of quadrant array. With the division of the thermopile into sectors, it becomes possible to measure the position of the laser beam by analysis of the comparative voltages generated in each sector of the thermopile, as well as the total power, by addition of all of the voltages from the sectors.

An important parameter regarding the laser beam itself is the beam size, as measured by any one of the parameters used in the art for such measurements. Power meters currently available are not able to provide a measure of this beam size. Beam size is an important parameter in applications involving the use of laser beams. Currently, a beam profiling instrument is generally required for performing such a measurement, and such a beam profiler is substantially more expensive for the user than a power meter.

The disclosures of each of the publications mentioned in this section and in other sections of the specification, are hereby incorporated by reference, each in its entirety.

SUMMARY OF THE INVENTION

In this disclosure there is described a laser power meter incorporating an absorber disc with a peripheral thermopile ring, either continuous or segmented, but further incorporating an additional detection element in the central portion of the disc that enables measurement of beam size.

In a first exemplary embodiment this detection element is a thermopile element, generally a ring, of smaller diameter than the peripheral thermopile ring usually used, and located closer to the center of the absorber disc. The diameter of this inner thermopile ring is sufficiently small that a laser beam of the size typically measured by the power meter under discussion, would impinge on the absorber disc such that it is partly inside the inner ring and partly outside the inner ring. With this arrangement the beam size can be measured, in addition to measurements of the power and the position of the beam.

In a thermopile disc, the heat from the laser beam needs to flow from the central area of the disc where the laser impinges, to the peripheral area of the disc, where the heat is sinked, by means of conduction through the material of the disc, generally a metal. Since there is resistance to the flow of heat in the metal, there arises a temperature gradient that is generally arranged radially in the disc. The thermopile is designed to measure this radial temperature gradient and in so doing, measures the quantity of heat flow.

The voltage or current produced by the thermopile is proportional to the power of the laser beam striking the central area of the disc. The thermopile is circularly symmetrical in such a way that it registers the same measurement, to a first order approximation, regardless of the size of the laser beam and regardless of whether the beam is accurately centered on the disc, on condition that the beam is effectively contained inside the area of the disc that is defined by the thermopile location. That portion of the laser beam which strikes the disc inside the effective radius of the thermopile is measured. Any portion of the beam outside the effective radius is not measured.

With the addition of a second smaller thermopile disposed at a radius smaller than that of the first thermopile, the laser beam may fit entirely inside the outer thermopile but only partly inside the inner thermopile. The outer thermopile measures the power of the laser beam in its entirety, but the inner thermopile measures only that portion of the beam that is inside the inner thermopile. Since measurement of the powers detected by the two thermopiles provides a measure of the distribution of power of the laser beam as a function of radius, it is possible to calculate the size of the beam from the comparative readings of these two thermopiles.

There is one disadvantage of the above described implementation, and that is that if the laser beam is smaller than the diameter of the inner thermopile, the meter will be unable to provide any information about beam size, since all of the heat flux arising from the laser beam will be intercepted and measured by the inner thermopile. In a second exemplary embodiment, this detection element that enables measurement of beam size is a single thermocouple junction located at the center of the disc, which acts as the hot junction of a thermocouple pair. The second or "cold" junction is effectively located on the disc close to the peripheral thermopile ring at the attachment points of the lead wires. This thermocouple measures the temperature difference between the center of the disc and a point near the periphery. This temperature difference is shown to be inversely proportional to the size of the beam for a given power over a wide range of beam sizes, such that measurement of this thermocouple output in addition to the thermopile output enables the power and the beam size to be determined. Instead of a thermocouple, any other temperature sensing device can be used at the center, such as a thermistor. However, another temperature measuring device is also required at the disc periphery, since it is the temperature difference between the center and the periphery which defines the heat flow outwards, and which is used for calculating the ratio between the heat flow from the center point of the disc to the total heat flow out, which is used to determine the beam size.

Compared to the first embodiment, this second method enables measurement of substantially smaller beams. With respect to measuring the size of small beams, the limiting factors are the size of the central thermopile junction and the thickness of the disc. When measuring the size of small beams, proper centering of the beam is important. Since the position of the beam can be determined at the same time by the segmented division of the peripheral thermopile ring, the operator can be warned of the need to center the beam, and can do so manually while observing the segment output information. Alternatively, an algorithm running on the instrument can use the various segment readings to calculate the necessary compensation for the measured decentering of the beam, and to correct the beam size measurement for this decentering.

Usually, the peripheral thermopile ring and the additional detection element in the central portion of the disc are located on the opposite surface of the disc to that on which the beam impinges, to avoid possibility of damage by direct impingement of the beam, but it is to be understood that the invention is not intended to be limited to this configuration.

There is thus provided in accordance with an exemplary implementation of the devices described in this disclosure, a disc for measuring properties of an incident optical beam, the disc comprising:

(i) a central region for absorbing the optical beam, (ii) a first thermoelectric element in the form of a first generally circular thermopile located radially outwards from the absorbing region, and on either side of the disc, (iii) a second thermoelectric measurement element disposed on the disc within the confines of the first thermopile, and (iv) electrical contacts to the first and to second thermoelectric measurement elements which enable measurement of the voltages generated by them, wherein the size of the optical beam incident on the disc can be determined from the ratio of the voltages measured on the first and the second thermoelectric measurement elements.

The second thermoelectric measurement element may be either a second generally circular thermopile located radially inwards of the first thermopile, in which case it should have an effective diameter smaller than that of the first thermopile, or it may be a thermocouple having a junction in the center region of the disc and disposed on the disc inwards of the first thermopile. In the latter case, the thermocouple should advantageously be disposed such that electrical connection thereto is effected at the peripheral area of the disc.

In any of the previously mentioned discs, the first thermopile may be divided electrically into segments, either into physically separate segments, or by means of taps on a continuous thermopile.

Other exemplary implementations may further involve a disc for measuring properties of an incident optical beam, the disc comprising:

(i) a region for absorbing the optical beam, (ii) a thermoelectric element in the form of a generally circular thermopile located radially outwards from the absorbing region, and on either side of the disc, (iii) a pair of temperature measurement elements disposed on the disc, one at the center of the disc, and the other at the periphery, and (iv) first electrical contacts to the thermoelectric measurement element and second electrical contacts to the pair of temperature measurement elements, the electrical contacts enabling measurement of the voltages generated by their associated elements, wherein the size of the optical beam incident on the disc is determined from the ratio of the voltages measured across the thermopile and across the a pair of temperature measurement elements. In such a disc, at least one of the pair of temperature measurement elements may advantageously be a thermistor.

Additionally, alternative implementations of any of the above-described systems may further involve a disc for measuring properties of an incident optical beam, the disc comprising:

(i) a region for absorbing the optical beam, (ii) a first thermopile having an effective diameter such that at least the majority of the region for absorbing the optical beam is contained within its effective diameter, (iii) a second thermopile having an effective diameter smaller than that of the first thermopile, and disposed on the disc within the confines of the first thermopile, and (iv) electrical contacts to the first and to second thermopiles which enable measurement of the voltages generated by the thermopiles, wherein the size of the optical beam incident on the disc can be determined from the ratio of the voltages measured on the first and the second thermopiles.

Another example implementation can involve a disc for measuring properties of an incident optical beam, the disc comprising:

(i) a region for absorbing the optical beam, (ii) a thermopile having an effective diameter such that at least the majority of the region for absorbing the optical beam is contained within its effective diameter, (iii) a thermocouple having a junction in the center region of the disc and disposed on the disc inwards of the first thermopile, and (iv) electrical contacts to the thermopile and to the thermocouple, which enable measurement of the voltages generated by the thermopiles, wherein the size of the optical beam incident on the disc can be determined from the ratio of the voltages measured on the thermopile and the thermocouple. In such a disc, the connections to the thermocouple may preferably be effected at the peripheral region of the disc.

In accordance with further exemplary implementations of the devices described in this disclosure, there is further provided a laser beam measurement system comprising:

(i) a beam absorber head containing a disc comprising an outer thermopile element and an inner thermoelectric element, both disposed on its surface, such that the power of the beam is determined by the voltage generated in the outer thermopile element, and beam size is determined by the ratio of voltages generated by the outer thermopile element and the inner thermoelectric element, and (ii) a display unit inputting voltages generated by the outer thermopile element and the inner thermoelectric element, and calculating therefrom the beam power and the beam size.

In such a laser beam measurement system, the inner thermoelectric element may be a second thermopile having an effective diameter smaller than that of the first thermopile, and disposed on the disc within the confines of the first thermopile. According to an alternative exemplary implementation, the inner thermoelectric measurement element may be a thermocouple having a junction in the center region of the disc. In either of these systems, the outer thermopile element may segmented, such that the display unit can calculate the beam power, the beam size, and the beam impingement position. Such segments may be either physically separate segments, or produced electrically by means of taps on a continuous thermopile.

Additional implementations can include a disc for measuring the power and position of impingement of an incident optical beam, the disc comprising:

(i) a region for absorbing the optical beam, the region being located in the central part of the disc, and (ii) a generally circular continuous thermopile located radially outwards from the absorbing region, in a peripheral region of the disc, wherein the continuous thermopile is provided with voltage taps located at intervals along its path, such that the voltages generated in different segments of the thermopile can be accessed by means of a single wire at junctions between segments. In such a disc, the voltage generated in the whole of the thermopile can be accessed by means of connection with a single pair of wire. Furthermore, measurement of the voltage across each successive segment requires the addition of only a single additional connection wire per segment.

Yet other implementations perform a method for measuring properties of an incident optical beam, comprising:

(i) providing an absorber disc for the beam, the disc having a central region for absorbing the optical beam, and a cooled periphery, (ii) measuring a first voltage generated in a first generally circular thermopile disposed on the disc, radially outwards from the absorbing region but on either side of the disc, the voltage resulting from impingement of the incident beam, (iii) measuring a second voltage generated in a second thermoelectric measurement element disposed on the disc within the confines of the first thermopile, the voltage resulting from impingement of the incident beam, and (iv) using the ratio of the first and second voltages to determine the size of the optical beam incident on the disc. In such a method, the second thermoelectric measurement element may be a second generally circular thermopile located radially inwards of the first thermopile. Alternatively, it may be a thermocouple having a junction in the center region of the disc and disposed on the disc inwards of the first thermopile.

BRIEF DESCRIPTION OF THE DRAWINGS

The present invention will be understood and appreciated more fully from the following detailed description, taken in conjunction with the drawings in which.

DETAILED DESCRIPTION

Figure 1:
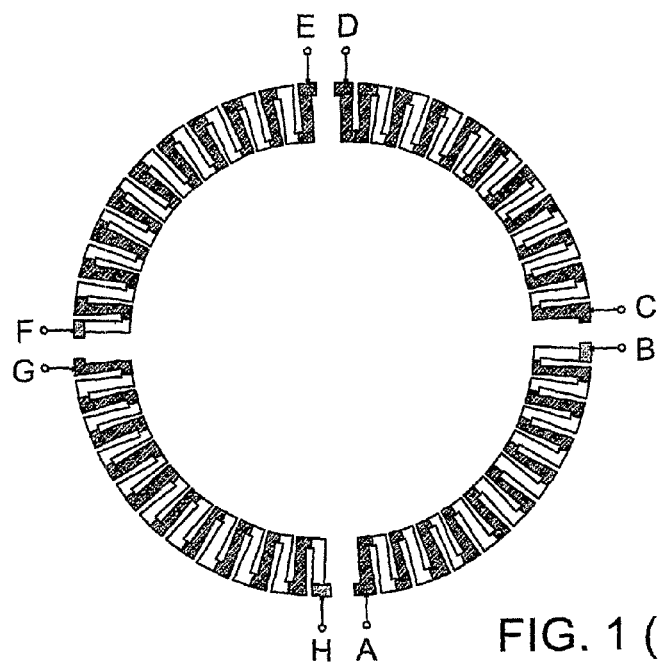
FIG. 1 shows a prior art laser power meter absorber disc having a four segmented thermopile.

Reference is now made to FIG. 1, which illustrates schematically the four segmented thermopile pattern of a prior art laser power meter absorber disc. So long as the laser beam falls within the confines of the thermopile, its power will be integrated by the thermopile regardless of the beam size. The confines of the thermopile are generally defined by the effective diameter of the thermopile, which for most practical purposes can be taken as the diameter of the innermost junctions of the thermopile, these being the hot junctions. Comparison of the voltages from the four segments, AB, CD, EF and GH, provides beam position information.

Figure 2:
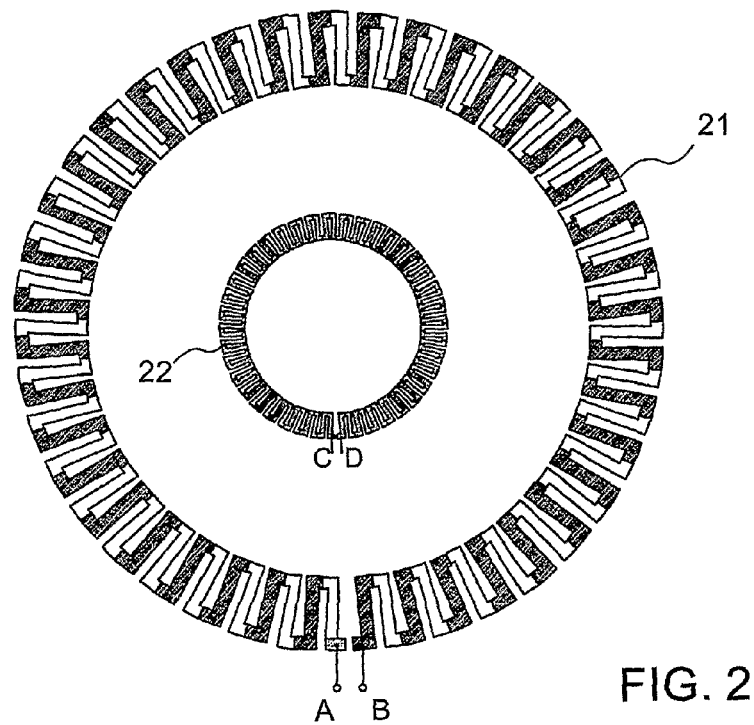
FIG. 2 illustrates schematically an exemplary laser power meter absorber disc of a first type, having two sets of concentric thermopiles.

Reference is now made to FIG. 2 illustrates schematically the thermopile detector pattern of an exemplary laser power meter absorber disc according to a first exemplary embodiment. The disc has two sets of concentric thermopiles. The outer thermopile 21 is a segmented element, as is known in the prior art, though it could also be a single continuous thermopile, as shown in FIG. 2 if beam position detection abilities are not required. The outer thermopile has output terminals AB, while the inner thermopile has output terminals CD. The inner thermopile 22, has a smaller diameter, which is selected to be smaller than the diameter of the laser beams to be measured by the power meter in which the disc is used. The laser beam thus impinges on the absorber disc such that it is partly inside the inner thermopile 22, and partly outside the inner thermopile 22.

Considering the case of the Gaussian beam shape. The intensity of the beam I(r) as a function of the radial direction r, is represented by the formula:

$$I(r) := I_0 \cdot e^{\left(\frac{-2 \cdot r^2}{w^2}\right)} \tag{1}$$

where w is the Gaussian beam size (radius) parameter and $I_0$ is the intensity at the center of the beam. The total power of the beam $P_0$ will therefore be given by the integrated intensity:

$$P_0 := I_0 \cdot \int_0^\infty 2\pi \cdot r \cdot e^{\left(\frac{-2 \cdot r^2}{w^2}\right)} dr \tag{2}$$

Evaluating the integral, the total power is thus expressed by:

$$P_0 := \frac{\pi \cdot I_0 \cdot w^2}{2} \tag{3}$$

If the Gaussian beam falls on a circle of radius b, with the circle and beam mutually centered and a portion of the power of the beam falls inside the circle and a portion of the beam falls outside the circle, the portion of the power that is inside the circle is given by:

$$P := P_0 \cdot \left[ 1 - e^{\left(\frac{-2 \cdot b^2}{w^2}\right)} \right] \quad (4)$$

Figure 3:
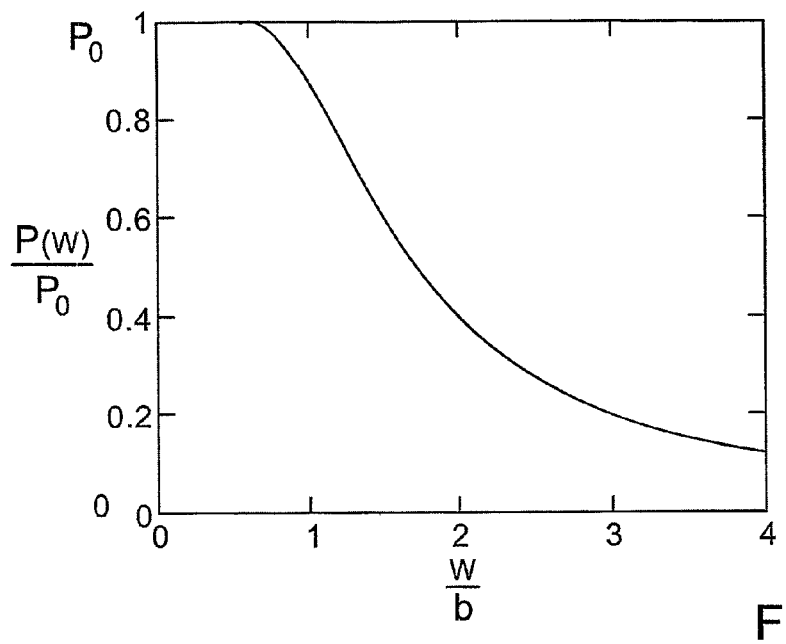
FIG. 3 is a graph showing the normalized fraction of power falling within a circle of radius b, as a function of the beam size w, relative to the circle radius b.

Reference is now made to FIG. 3, which is a graph of the function of equation (4), showing the normalized fraction of power falling within the circle of radius b, $P(w)/P_o$ as a function of the beam size w relative to the circle radius b, w/b. This graph shows how the sensitivity of a measurement of the power by the inner thermopile of FIG. 2, depends on the relationship between w and b. From the graph, it is clear that so long as the effective radius w of the Gaussian beam is between approximately 1 and 4 times the radius b of the inner thermopile, the percentage of power measured on the inner thermopile can be used to determine the beam size with reasonable accuracy. Once the effective radius w of the Gaussian beam is less than the radius b of the inner thermopile, the ratio $P(w)/P_o$ does not change, and cannot be used to measure the beam size. This analytic result is the equivalent of the observed effect stated hereinabove, that once the beam falls essentially entirely within the inner thermopile, the output of the inner thermopile is independent of the beam size, and the system cannot be used to measure beam size.

The analysis above assumes a Gaussian beam shape. There are many types of beam shape such as multimode and top-hat. The relationship between the relative power measurement of the inner thermopile and the beam size depends on the type of the beam profile, and also on the beam symmetry. If an input can be provided to the power meter relating to the type of beam profile, the accuracy of the calculation of the beam size can be improved by taking into account different beam profiles. The beam size calculation can incorporate parameters that quantify profile type such as Gaussian $TEM_{00}$ or top-hat. Since the sensor itself is not capable of measuring beam profile, the instrument operator will need to set the proper parameters according to the known beam shape.

Figure 4:
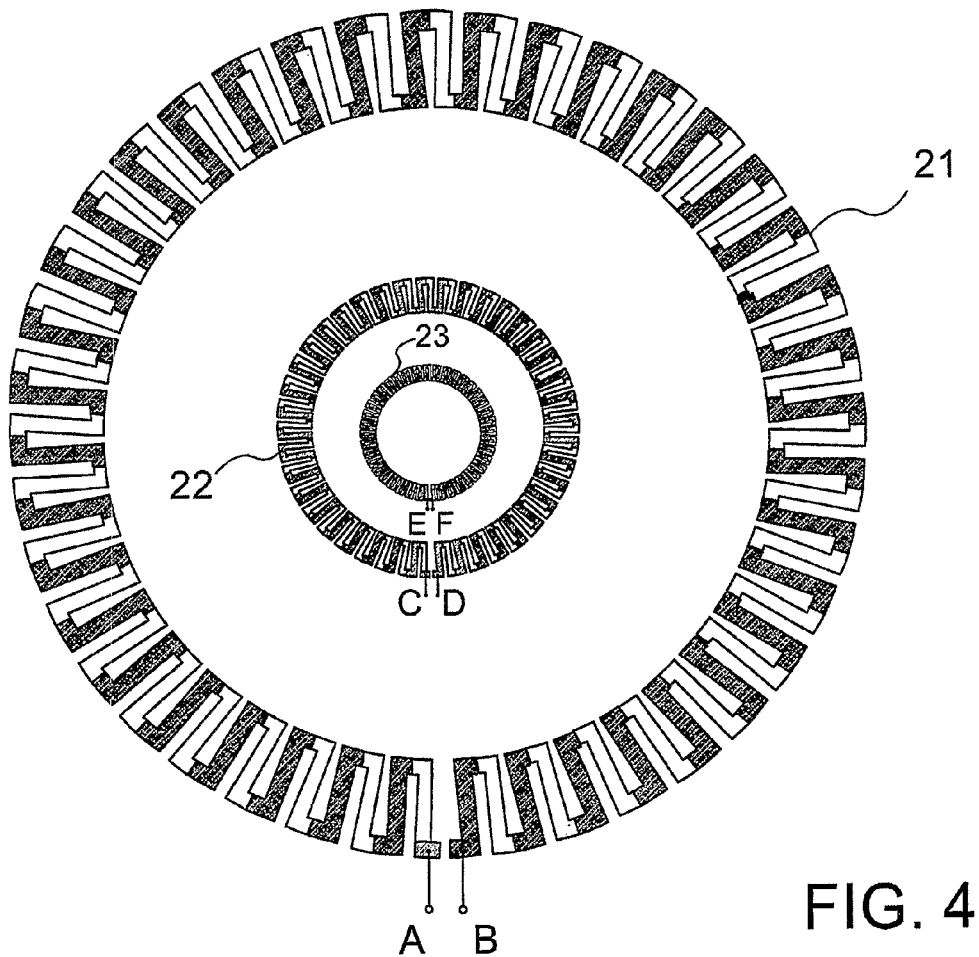
FIG. 4 illustrates schematically an exemplary laser power meter absorber disc of the type shown in FIG. 2, having three rather than two sets of concentric thermopiles.

Reference is now made to FIG. 4, which illustrates schematically another implementation of the thermopile disc, utilizing a number of concentric inner thermopile rings of different sizes, in order to increase the accuracy and dynamic range of the size measurement. In the implementation of FIG. 4, three thermopile rings are shown—an outer thermopile 21 with terminals AB for measuring the total power, and middle 22 and inner 23 thermopile rings whose outputs at terminals CD and EF respectively, are compared with the output of the outer ring in order to provide the user with accurate beam size information. Output CD from the middle ring is used mainly in determining the size of the larger beams measured with the power meter, while output EF from the inner ring is used in determining the size of the smallest beams measured with the power meter. The beam measurement circuitry is may be provided with an algorithm to take account of the ratio of the outputs of all three thermopile rings, in order to measure a wide range of beam sizes and with greater accuracy than an equivalent power meter having only a single inner thermopile.

There is a limit to the smallest laser beam which this absorber disc can measure since a practical thermopile needs to be at least a few millimeters in diameter, and a laser beam smaller than this would be completely within the diameter of the inner thermopile. However, by scanning the beam across the inner thermopile, it is possible to obtain a time dependent measurement and from this, to calculate the beam size, even if the beam is significantly smaller than the inner thermopile ring.

Figures 5A, 5B, 5C:
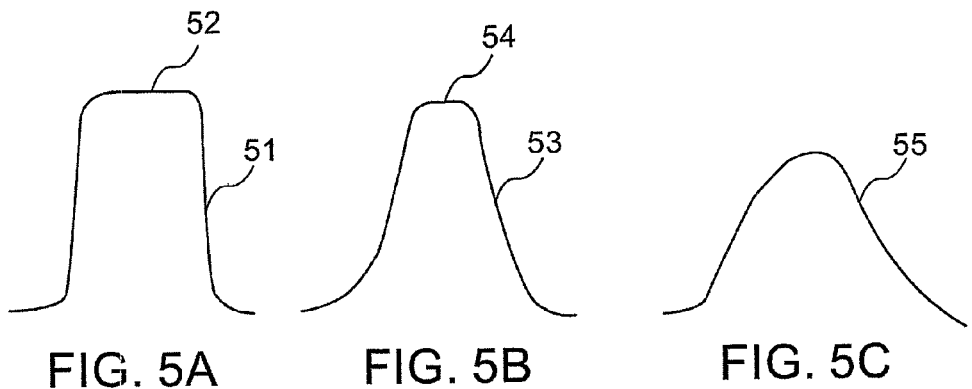
FIGS. 5A-5C show schematic profiles obtained by differently sized beams of the same power, as they are scanned across the inner thermopile of a disc of the FIG. 2 type.

Reference is now made to FIGS. 5A, 5B and 5C, which illustrate how this can be performed. The figures show the profiles obtained by three differently sized beams of the same power, as they are scanned across the inner thermopile 22 of the embodiment of FIG. 2. FIG. 5A illustrates the output at terminals CD obtained when a small beam is scanned across the center of the disc. As the beam crosses the pattern of the inner thermopile, the output rises sharply 51 to a plateau 52, remains constant as the small beam traverses the region within the inner thermopile pattern, and drops again sharply as the beam crosses the opposite side of the thermopile pattern. FIG. 5B shows the output generated when a medium sized beam is scanned across the inner thermopile pattern. In this case as the larger beam crosses the pattern the output rises more gradually 53, reaches a small plateau 54 while the beam is entirely within the inner thermopile, and then drops off again gradually as it crosses the opposite side of the thermopile pattern. FIG. 5C shows the output generated when a significantly larger beam is scanned across the disc. In this illustrated case, the beam is of a size somewhat larger than the inner thermopile diameter, and so rises considerably more gradually 55, and never reaches a plateau output. Analysis of the sharpness of the scanned output profile thus enables a more accurate estimate of the beam size to be obtained.

Since the temperature of the center of the disc can become quite high if the power of the beam is near to the power rating of the disc, a thermopile ring near the middle of the disc should be constructed such that it withstands such increased temperatures. Possible ways to achieve this are: 1) to reduce the power rating compared to a similar disc that does not have the central thermopile; or 2) to overcoat the central thermopile with glass, ceramic, or another material to prevent oxidation or any other chemical process that could occur at high temperatures.

Figure 6:
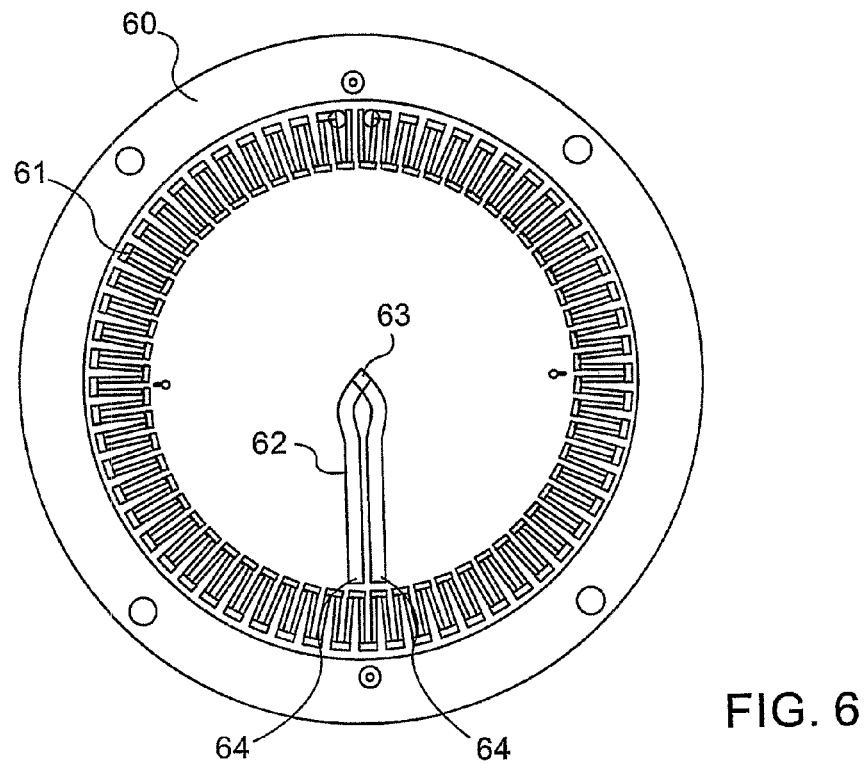
FIG. 6 illustrates schematically another exemplary laser power meter absorber disc, having a peripheral thermopile ring and a thermocouple with its hot junction at the center of the disc.

Reference is now made to FIG. 6 which illustrates schematically an exemplary laser power meter absorber disc 60 according to a further implementation of the present invention, having a thermopile 61 at the periphery of the disc and a thermocouple 62 at the center, instead of another thermopile. The thermopile 61 may be a segmented element, as is known in the art, or a single continuous thermopile if beam position detection abilities are not required. The thermocouple 62, has a hot junction 63 at the center of the disc. The connections of the lead wires at the ends of the thermocouple conductors 64 form the effective cold junction, such that the thermocouple measures the temperature difference between the center of the disc and the periphery. As mentioned in the Summary section of this disclosure, although FIG. 6 shows a thermocouple as the central temperature detector, it is to be understood that instead of a thermocouple, any other temperature sensing device can be used at the center, such as a thermistor. A temperature sensor at the periphery is also then required to provide the differential temperature measurement.

Figure 7:
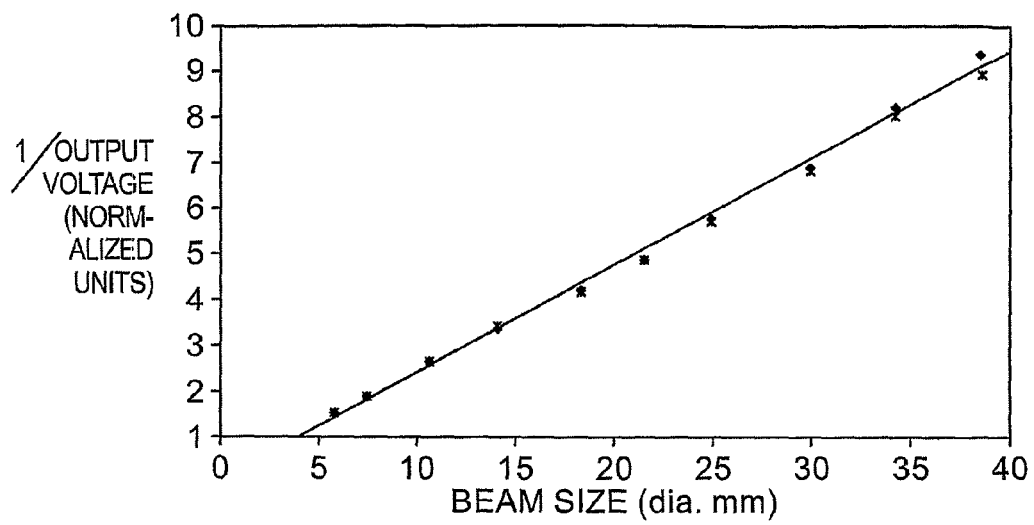
FIG. 7 is a graph showing the relationship between beam size and thermocouple reading for large size beams for the absorber disc type shown in FIG. 6.

Reference is now made to FIG. 7, which is a graph generated using the disc of FIG. 6, of the reciprocal of the thermocouple reading measured in inverse millivolts as a function of the beam diameter, for comparatively large sized beams. The ordinate scale of the graph in FIG. 7 is plotted in arbitrary normalized units. This case is of a 5 Watt Gaussian beam impinging on a disc having an outer thermopile diameter of 50 mm. The different sizes were generated by focusing the beam with a lens and then positioning the head in which the disc was mounted at various distances beyond the focal point. The thermocouple voltage depends on beam power as well as beam size. Therefore the ratio between the thermocouple voltage and the thermopile voltage is the correct parameter used to quantify beam size. By this means, the absolute thermocouple reading is normalized for the effect of different beam powers. Expressed in everyday terms, this means that both the thermocouple and the thermopile measure the beam power, and the ratio of the readings between them is a measure of how much the power is concentrated towards the centre of the disc. Inspection of the graph of FIG. 7 shows a plot very close to an inverse linear relationship, for beams of diameter 38 mm down to 4 mm. Below 4 mm, the derived thermocouple current departs from the linear relationship and flattens out. This is shown more clearly in FIG. 8 below.

Figure 8:
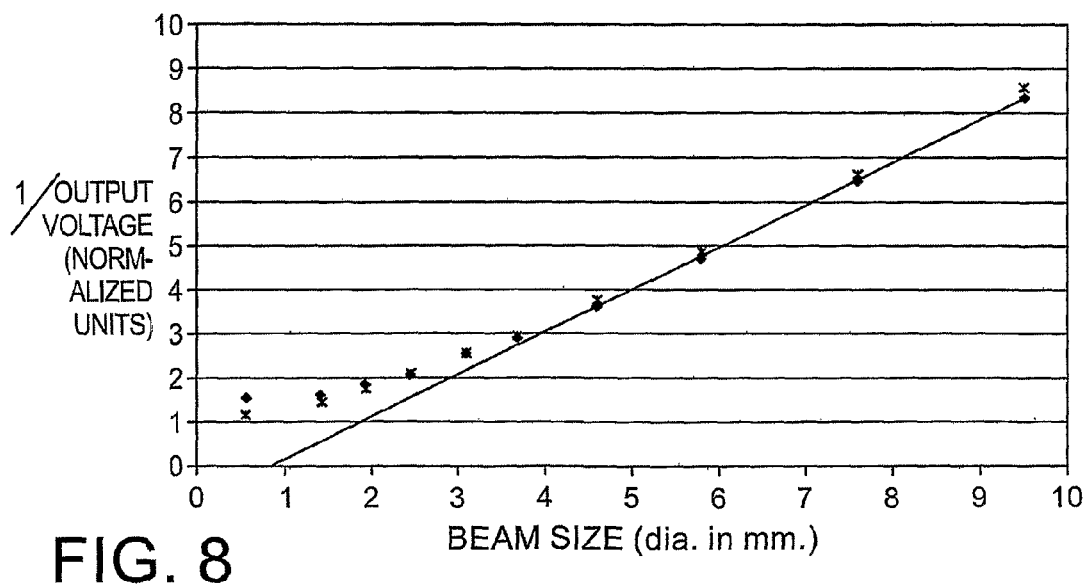
FIG. 8 is a graph showing the relationship between beam size and thermocouple reading for small size beams for the absorber disc type shown in FIG. 6.

Reference is now made to FIG. 8, which is a graph of the reciprocal of the inverse thermocouple reading in inverse millivolts as a function of the beam radius for smaller beams, using the same measurement technique and parameters as for the example of FIG. 7. The ordinate scale of the graph in FIG. 8 is plotted in arbitrary normalized units. It is noted that for a beam radius of less than 4 mm the function departs from the linear relationship. This is due to size of the hot junction and the thickness of the disc, which causes thermal spreading. If the hot junction is made smaller and the disc is made thinner, then measurement capability is extended to smaller sized beams.

It should be noted that the reading of the central thermocouple is highly sensitive to beam position when measuring small beams—the smaller the beam more sensitive is its reading to change in position. Signal reduction of several percent results from sub-millimeter beam decentering. For example, on a 60 mm diameter, 1.1 mm thick aluminum disc, the reading of the central thermocouple drops by 2.6% when the blue beam is moved 0.5 mm off center. Several possible strategies can be used to cope with this sensitivity. The instrument user interface can be configured to warn the operator to properly center the beam, as described hereinabove. Alternatively the sensor can incorporate a positioning mechanism to automatically center the beam under feedback control. A third possibility is to compensate the decentering in the calculation of the beam size in the instrument software, using predetermined characterization of the change in signal as a function of beam misalignment. All of these options use the information from the segmented thermopile to determine the level of decentering.

Referring back now to the prior art segmented thermopile sensors shown in FIG. 1, it is seen that each segment has its own output terminals, and that when all of the segments are connected in series, the total laser power is measured by measuring the voltage output, V0, between terminals A and H as in conventional power sensors.

Figure 9:
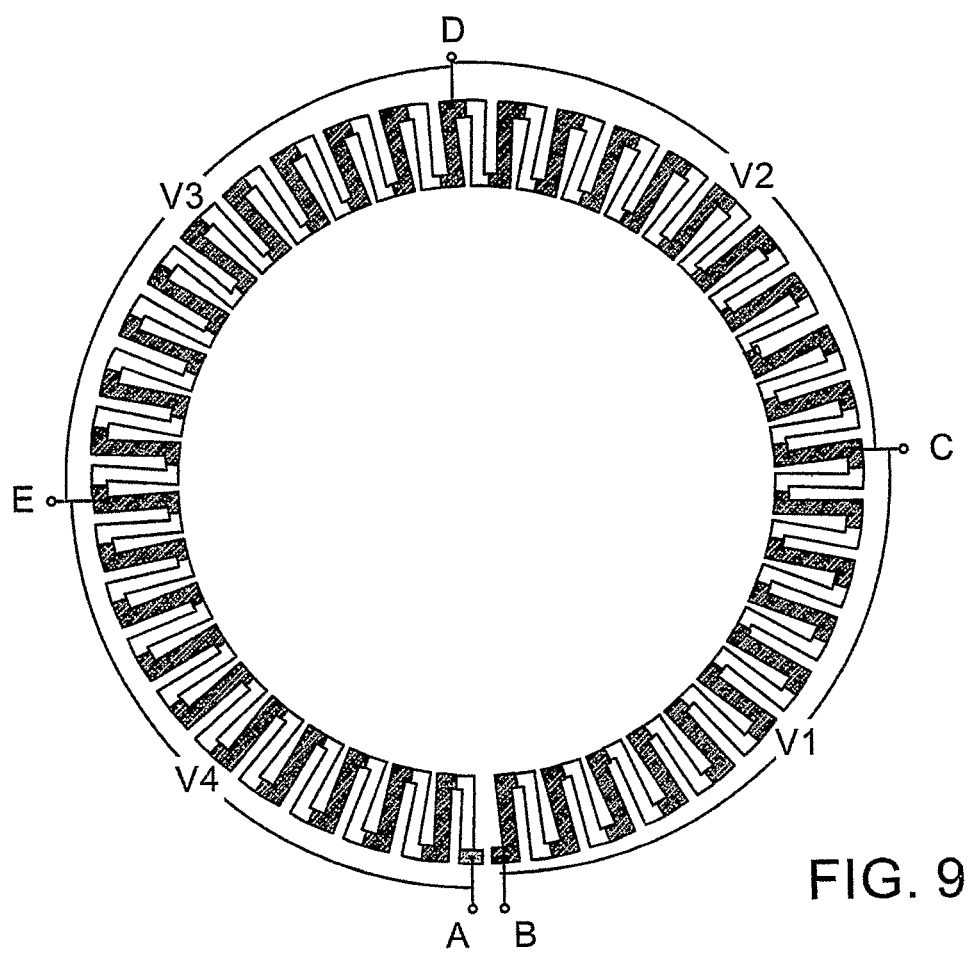
FIG. 9 shows schematically an improved thermopile disc which enables more convenient beam position measurements to be made than that of FIG. 1.

Reference is now made to FIG. 9, which illustrates schematically an improved thermopile disc which enables more efficient beam position measurements to be made. Instead of the separate segments of the thermopile of FIG. 1, the present thermopile has a continuous geometry, and the individual segments are monitored by means of voltage taps C, D, E located at intervals around the thermopile.

Positional measurement is accomplished by measuring 4 additional voltage values V1, V2, V3 & V4, respectively between terminals B and C, C and D, D and E, E and A. The X and Y positions of the beam may then be calculated according to the formulae:

$$X \text{ position} = ((V1+V2)-(V3+V4))/(V1+V2+V3+V4)$$

$$Y \text{ position} = ((V2+V3)-(V1+V4))/(V1+V2+V3+V4)$$

High input impedance circuitry may be used to connect to the terminals in order to prevent any interference with measurement of V0. A high impedance circuit may also be employed in the measurement of V0 in order to avoid any interference with measurement of voltages V1 thru V4.

The thermopile construction shown in FIG. 9 has several advantages over prior art segmented thermopile configurations, as shown in FIG. 1:

(i) Only one voltage measurement is needed to measure the total laser power. In the segmented configuration, four measurements are made and their results summed. This increases the measurement error by a factor of two times.

(ii) Minimal change is required from existing methods of operation.

(iii) The laser power measurement is compatible with earlier equipment.

(iv) Calibration of the power measurement is identical to that used for earlier equipment.

(v) Only 3 additional connection terminals are required as opposed to 6 in the segmented design.

(vi) Devices with and without position sensing capabilities can use common components. If position sensing capability is not required, the 3 additional terminals need not be connected.

Figure 10:
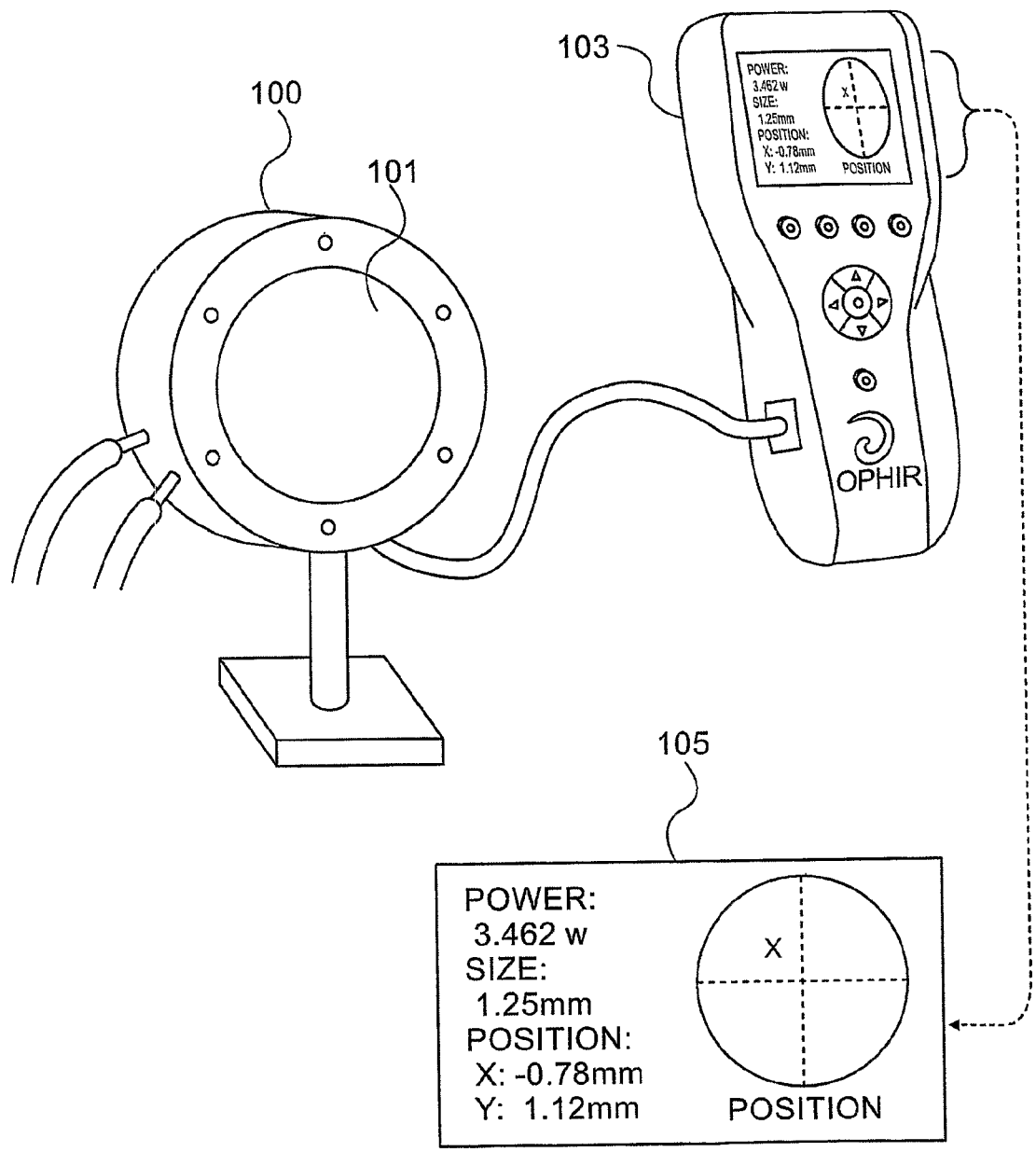
FIG. 10 illustrates schematically a laser power meter system, capable of measuring beam power, size and position in one instrument, by incorporating the features of the various disc implementations of FIGS. 2, 4 and 6.

Reference is now made to FIG. 10, which illustrates schematically a laser power meter system, capable of measuring beam power, size and position in one instrument, by incorporating the features of the various disc implementations described hereinabove. The system includes an absorber head 100 in which is fitted any of the discs 101 of the type shown in FIG. 2, 4 or 6. The particular head shown in FIG. 10 is a water cooled head, though it is to be understood that an air cooled head could equally well be used, when appropriate for the application. The voltage signals from the absorber head are transferred to the display unit 103, where they are processed to display the parameters measured by the head. If a disc with an un-segmented outer thermopile is fitted in the head, the display unit can indicate the total power of the beam and the beam size. Optionally, if the outermost thermopile is segmented, the display unit can indicate the total power of the beam, the beam size and the beam position. An enlarged drawing of the screen 105 of the display unit is also shown in FIG. 10, illustrating these three parameters displayed together in a single instrument.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A disc for measuring properties of an incident optical beam, said disc comprising:
    a central region for absorbing said optical beam;
    a thermopile located radially outwards from said central region;
    a single temperature measurement element disposed on the center of the surface of said disc within the confines of said thermopile; and
    electrical contacts to said thermopile and to said temperature measurement element which enable measurement of the voltages generated by them, the ratio of the voltages measured on said thermopile and said temperature measurement element enabling the size of said optical beam incident on said disc to be determined, wherein said single temperature measurement element is adapted to accurately measure the size of an incident optical beam having an area as small as the area of said single temperature measurement element.

2. A disc according to claim 1 wherein said temperature measurement element is a thermistor.

3. A disc according to claim 1, further comprising an additional temperature measurement element at the periphery of said disc, such that said temperature measured on said temperature measurement element can be normalized according to the temperature measured at the periphery of said disc.

4. A disc according to claim 1 wherein said single temperature measurement element is a thermocouple having a single junction located at the center of the disc.

5. A disc according to claim 4 wherein the thermocouple is disposed such that electrical connection thereto is effected at the peripheral area of the disc.

6. A disc according to claim 1, wherein said thermopile is divided electrically into separate segments, such that the position of impingement of said incident optical beam can be determined from the comparative voltages generated by said separate segments.

7. A disc according to claim 1, wherein said thermopile has an effective diameter such that at least the majority of said central region for absorbing said optical beam is contained within said effective diameter.

8. A method for measuring properties of an incident optical beam, comprising:

providing an absorber disc for said beam, said disc having a central region for absorbing said optical beam, and a cooled periphery;

measuring a first voltage generated in a thermopile disposed on said disc radially outwards from said central region, said voltage resulting from impingement of said incident beam;

measuring a second voltage generated in a single temperature measurement element disposed on the center of the surface of said disc within the confines of said first thermopile; and using the ratio of said first and second voltages to determine the size of said optical beam incident on said disc, wherein the use of a single temperature measurement element enables accurate measurement of the size of an incident optical beam having an area as small as the area of said single temperature measurement element.

9. A method according to claim 8 wherein said single temperature measurement element is a thermistor.

10. A method according to claim 8 wherein said single temperature measurement element is a thermocouple having a single junction located at the center of the disc.

11. A method according to claim 8, wherein said thermopile has an effective diameter such that at least the majority of said central region for absorbing said optical beam is contained within said effective diameter.

\* \* \* \* \*